Patented Feb. 4, 1941

2,230,774

UNITED STATES PATENT OFFICE

2,230,774

BASIC ESTERS AND METHOD OF PREPARING THEM

Max Bockmühl and Gustav Ehrhart, Frankfort-on-the-Main, Germany, assignors to Winthrop Chemical Company, Inc., New York, N. Y., a corporation of New York No Drawing. Application August 23, 1939, Serial No. 291,525. In Germany July 4, 1938

4 Claims. (Cl. 260—247)

The present invention relates to basic esters and to a method of preparing them.

We have found that basic esters of the general formula:

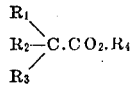

wherein $R_1$ and $R_2$ stand for aryl radicals, $R_3$ stands for a basically substituted alkyl-radical and $R_4$ stands for a member of the group consisting of alkyl- or aralkyl radicals, are good spasmolytica and analgetica.

The new compounds are obtainable by causing a nitrile of the general formula:

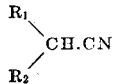

wherein $R_1$ and $R_2$ stand for aryl radicals, for instance, the diphenylacetic acid nitrile, or the derivatives of such nitriles substituted in the phenyl nucleus to react in known manner with a basically substituted alkyl halide, for instance piperidinoethyl chloride, diethylaminoethyl chloride and the like, in the presence of agents splitting off hydrogen halide, for instance alkali, sodium amide or alkali alcoholate, and by transforming the tertiary nitriles thus obtained into the corresponding esters.

Said basic esters may likewise be obtained by causing a metal compound of the general formula:

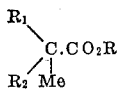

wherein $R_1$ and $R_2$ stand for aryl radicals, which may be connected with each other, Me stands for an alkali metal and R stands for a member of the group consisting of alkyl- or aralkyl radicals, to react with a basically substituted halogen alkyl, for instance piperidinoethyl chloride, diethylaminoethyl chloride, morpholinoethyl chloride and the like. There is suitably first prepared the sodium compound of the diarylacetic acid ester, for instance by causing the sodium compound of the diethylacetonitrile or the like to act upon the diarylacetic acid ester, diethylacetonitrile being simultaneously formed again. Thereupon, a basically substituted halogen alkyl is caused to act upon the sodium compound of the diaryl acetic acid ester. It is also possible to prepare, for instance, the potassium compound of the fluorene-9-carboxylic acid ethyl ester by causing potassium alcoholate to act upon a fluorene carboxylic acid ethyl ester and, thereupon, to cause the basically substituted halogen alkyl to act upon the compound.

The new compounds are obtained in the form of colorless oils which are immiscible with water and which may be transformed into water-soluble salts by means of acids.

The following examples serve to illustrate the invention, but they are not intended to limit it thereto:

(1) 6 grams of sodium amide, finely pulverized in 150 cc. of dry benzene, are added while stirring to 27 grams of diphenylacetonitrile in 100 cc. of dry benzene. After the temperature produced by the reaction has fallen, 18 grams of piperidinoethyl chloride in 200 cc. of benzene are added. Thereby the temperature rises to about 50° C. After the reaction has finished the whole is stirred for some hours and the benzene extract is shaken with dilute hydrochloric acid. The hydrochloride of the diphenylpiperidino-ethylacetic acid nitrile which thereupon separates is in the form of a light brown oil which is decanted. It is diluted with water rendered alkaline by means of caustic soda solution and the diphenylpiperidino-ethylacetic acid nitrile is extracted with ether. After distillation of the ether the residue solidifies in a crystalline form and may be recrystallized from petroleum ether. The product melts at 76° C.

30.5 grams of diphenylpiperdino-ethyl acetonitrile are heated in the oil bath to 145–150° C. with 120 grams of sulfuric acid of 70 per cent strength until a test portion remains clear when diluted with water and rendered alkaline. Ethyl alcohol is then introduced drop by drop below the surface into the hot liquid having a temperature of 105–110° C. until the distilling alcohol is free from water. The whole is then poured into water, made alkaline by means of caustic soda solution and the diphenylpiperidino-ethylacetic acid ethyl ester is extracted with ether. By adding the calculated quantity of ethereal hydrochloric acid to the dry ethereal solution the hydrochloride immediately separates; it is filtered with suction and crystallized from acetone-ether. The yield amounts to 25 grams. The product melts at 176–177° C.

If diethylaminoethyl chloride is used instead of piperidinoethyl chloride there is obtained under the same conditions the diphenyldiethylaminoethylacetic acid ethyl ester hydrochloride boiling at 200–202° C. under a pressure of 5 mm.

(2) 6 grams of diphenylpiperidino-ethyl aceto nitrile are saponified as described in Example 1 with sulfuric acid of 70 per cent strength and isopropyl alcohol is introduced drop by drop. After working up 3 grams of diphenylpiperidinoethyl acetic acid isopropyl ester hydrochloride are obtained melting at 210–211° C.

(3) A mixture of 9.7 grams of diethylacetonitrile and 11.2 grams of chlorobenzene is added, drop by drop, while stirring, to 50 cc. of dry benzene which contains 4.6 grams of sodium wire. The temperature is suitably kept at 30° C.–35° C. by cooling. After the reaction is finished, a solution of 24 grams of diphenylacetic acid ethyl ester in 50 cc. of benzene is added, drop by drop, the temperature suitably not being raised above 30° C.–35° C. After this reaction is complete, 24 grams of piperidinoethyl chloride are added, drop by drop, and the mixture is then boiled in a reflux apparatus for 2 hours. Water is thereupon added, the benzene extract is separated and shaken with dilute hydrochloric acid, the hydrochloric acid solution is rendered alkaline by means of potassium carbonate, shaken with ether, and finally the ethereal residue is distilled under reduced pressure. The diphenyl-piperidinoethyl acetic acid ethyl ester thus obtained distils at 208° C.–212° C. under a pressure of 3 mm. Its hydrochloride melts, after redissolving from acetone, at 177° C.

(4) 16.6 grams of diethylacetonitrile and 19.1 grams of chlorobenzene are added, drop by drop, in the manner described in Example 3, while stirring, to 100 cc. of dry benzene which contains 8 grams of sodium wire. Thereupon, 41 grams of diphenylacetic acid ethyl ester and, finally, 20 grams of morpholinoethyl chloride in 50 cc. of benzene are added, drop by drop. After working up as described in Example 3, the diphenyl-morpholinoethyl acetic acid ethyl ester is obtained, boiling at 218° C.–222° C. under a pressure of 4 mm. Its hydrochloride melts at 166° C.–167° C.

(5) A mixture of 1.6 grams of potassium and 8 cc. of absolute alcohol is added, while hydrogen is being passed through the mixture, to 9.5 grams of fluorene carboxylic acid ethyl ester dissolved in 100 cc. of absolute ether. As soon as the entire amount of potassium has dissolved, 6 grams of piperidinoethyl chloride, dissolved in 25 cc. of absolute ether, are added and the mixture is boiled on the steam bath. After working up as indicated in Example 3, the piperidinoethyl-fluorene carboxylic acid ethyl ester is obtained boiling at 238° C.–240° C. under a pressure of 8 mm. Its hydrochloride melts at 208° C.–209° C. while decomposing.

(6) 3 grams of morpholinoethyl chloride are caused to run into a suspension of the sodium compound of the fluorene carboxylic acid ethyl ester in benzene, prepared according to Example 3 from 2.8 grams of sodium, 7 grams of chlorobenzene, 5.6 grams of diethylaceto nitrile and 12 grams of fluorene carboxylic acid ethyl ester. After working up as described in Example 3 the morpholino-ethylfluorene carboxylic acid ethyl ester is obtained boiling at 227° C.–230° C. under a pressure of 4 mm. The hydrochloride thereof melts at 185° C.–186° C.

If instead of fluorenecarboxylic acid ethyl ester fluorenecarboxylic acid isopropyl ester, fluorenecarboxylic acid butyl ester or fluorenecarboxylic acid benzyl ester is used, the reaction takes the same course as indicated above.

(7) 12 grams of alpha-methylpyrrolidinoethyl chloride in 50 cc. of benzene are added, drop by drop, to the sodium compound of the diphenyl-acetic acid ethyl ester prepared according to Example 3 from 19.5 grams of diphenylacetic acid ethyl ester; the mixture is then boiled in a reflux apparatus for 2 hours. After working up as indicated in Example 3, the diphenyl-alpha-methylpyrrolidinoethyl acetic acid ethyl ester is obtained boiling at 212° C.–214° C. under a pressure of 3.5 mm.

(8) 30 grams of phenyl-veratrylacetic acid ethyl ester are transformed, in the manner described in Example 3, into the sodium salt of phenyl-veratrylacetic acid ethyl ester; to the reaction product thus obtained 15 grams of morpholinoethyl chloride are added and the whole is boiled for two hours in a reflux apparatus. After working up as indicated in Example 3, 20 grams of phenyl-veratrylacetic acid ethyl ester are obtained boiling at 257–260° C. under a pressure of 3.5 mm.

We claim:

1. The products of the following general formula:

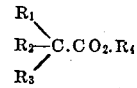

wherein $R_1$ and $R_2$ stand for aryl radicals, $R_3$ stands for a tertiary amino alkyl radical, and $R_4$ stands for a member of the group consisting of alkyl- and aralkyl radicals, being colorless oils which are immiscible with water and which may be transformed into water-soluble salts by means of acids.

2. The diphenyl-diethylamino-ethylacetic acid ethyl ester.

3. The diphenyl - piperidinoethylacetic acid ethyl ester.

4. The diphenyl - morpholinoethylacetic acid ethyl ester.

MAX BOCKMÜHL.
GUSTAV EHRHART.